May 13, 1958 E. L. KLINGEL 2,834,838

TELEPHONE CALLING DEVICE

Filed Oct. 3, 1956

INVENTOR

EDWARD L. KLINGEL

Caswell & Lagaard

ATTORNEYS 2,834,838

TELEPHONE CALLING DEVICE

Edward L. Klingel, St. Paul, Minn.

Application October 3, 1956, Serial No. 613,634
4 Claims. (Cl. 179—90)

The herein disclosed invention relates to telephone calling devices and has for an object to provide a device which will be simple and foolproof in construction and which can be manufactured at an economical cost.

Another object of the invention resides in providing a device in which gears and similar transmission elements have been eliminated to reduce the wear and tear on the parts and to provide a construction which will not readily get out of order.

The instant invention is particularly applicable to telephone calling devices utilizing supporting means in which a shaft is rotatably mounted and which carries a finger wheel movable past a fixed dial and opening and closing a switch successively as the shaft rotates.

An object of the invention resides in providing magnetic means between said shaft and supporting means and serving to retard the movement of the shaft sufficiently to procure successive timed operation of the switch.

A still further object of the invention resides in providing a magnetic structure including a permanent magnet having poles formed thereon and in providing a core having poles thereon cooperating with the poles of the magnet.

Another object of the invention resides in constructing the core with an amortisseur winding.

Another object of the invention resides in constructing the core with one or more groups of poles and the magnet with the same number of groups of poles, the poles in each group of one thereof differing from the poles in the other thereof by one.

A feature of the invention resides in the specific construction for varying the tension of the spring on the shaft whereby adjustment can be made without taking the device apart.

A still further object of the invention resides in the specific construction of the switch mechanism of the invention.

Other objects of the invention reside in the novel combination and arrangement of parts and in the details of construction hereinafter illustrated and/or described.

Figures 1, 2, 3, 4, 5, 6, 7, 8, 9:
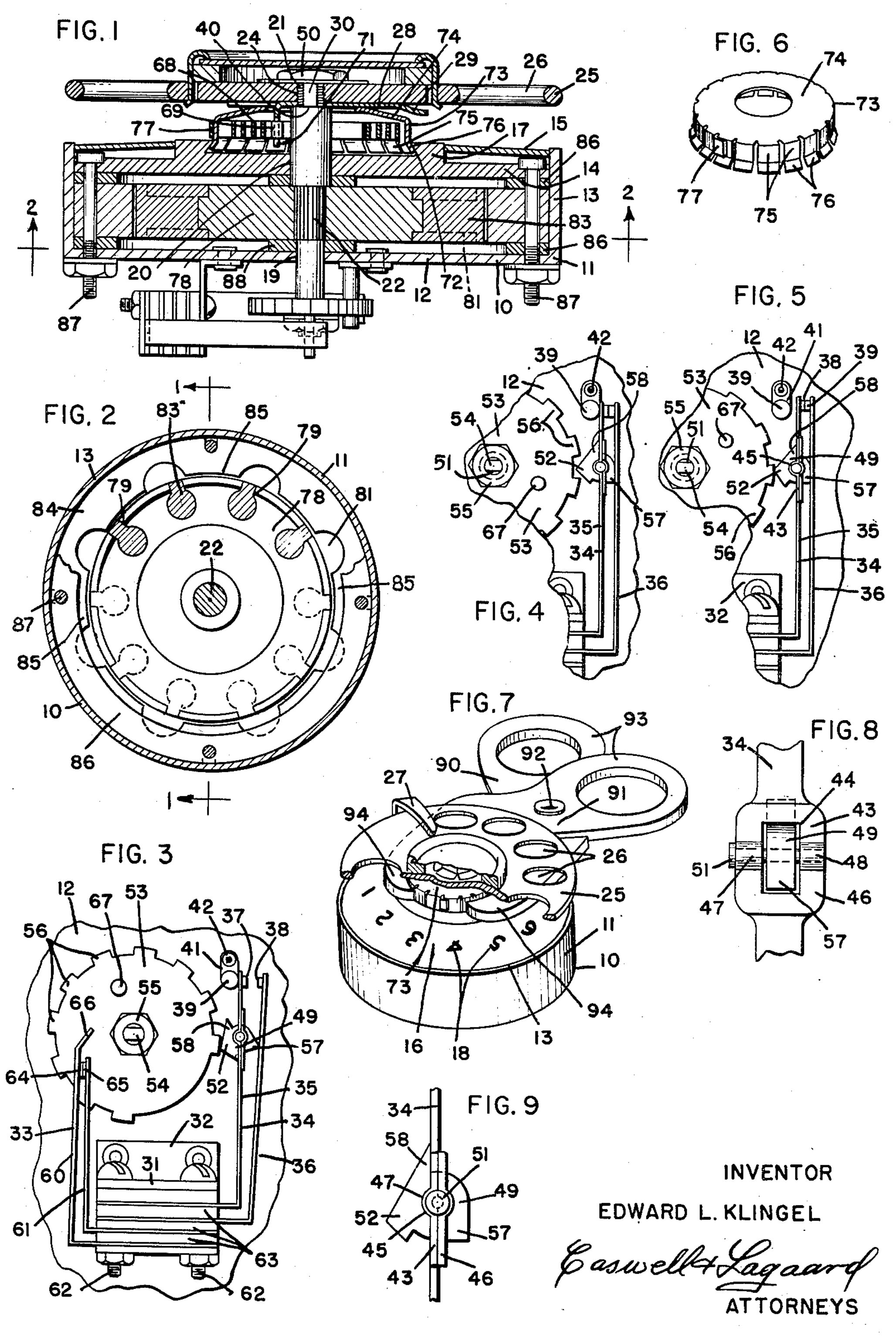
Fig. 1 is an elevational-sectional view of a telephone calling device illustrating an embodiment of the invention and taken on line 1—1 of Fig. 2 and drawn to an enlarged scale.
Fig. 2 is an elevational-sectional view taken on line 2—2 of Fig. 1.
Fig. 3 is an elevational view of the switch mechanism of the invention.
Fig. 4 is a fragmentary view of the structure shown in Fig. 3 with the parts in altered position.
Fig. 5 is a view similar to Fig. 4 showing the parts in still different positions.
Fig. 6 is a perspective view of the spring case of the invention.
Fig. 7 is a persepctive view of the device showing the construction for adjusting the spring tension.
Fig. 8 is an elevational view of a portion of one of the leaves of the calling switch of the invention and drawn to an enlarged scale.
Fig. 9 is a plan view of the structure shown in Fig. 8 and drawn to the same scale.

The telephone calling device shown in the drawings consists of supporting means 10 which includes a housing 11. This housing is constructed from sheet metal and is cup-shaped in form having a bottom 12 and a rim 13, said housing being open at the upper end of the same. The housing 11 is closed by means of a circular closure 14 which fits into the rim 13. Overlying the closure 14 is a dial supporting annulus 15 which has formed on it a dial 16. The closure 14 is formed with a sleeve 17 extending outwardly therefrom and the annulus 15 is pressed on said sleeve and thus held supported on the closure. The dial 16 is constructed with numerals 18 printed thereon and which run from 1 to 10, said numerals being spaced apart center to center less than $1/11$ of the circumference of the dial.

The closure 14 and the bottom 12 of housing 11 are formed with concentric bores 19 and 20, which form bearings journaling a shaft 22. The upper end of the shaft 22 is formed with a reduced portion 21 and which is constructed with threads 24 and a keyway 30. Mounted on the portion 21 of said shaft is a finger wheel 25. The wheel 25 engages a washer 28, also mounted on the reduced portion 21 of said shaft, and which butts up against the shoulder 40 formed between said reduced portion and the shaft proper. Both the wheel 25 and the washer 28 engage the keyway 30 and are keyed to the shaft. A nut 50 received on the threads 24 engages wheel 25 and holds the parts attached to the shaft. The finger wheel 25 has a number of openings 26 formed therein and which register with the numerals 18 on the dial 16. Attached to the annulus 17 is a stop 27 disposed adjacent the numeral 10 and which limits the movement imparted to the wheel 25 when the finger is inserted in one of the holes 26 and the wheel rotated toward said stop. Movement of the shaft 22 in the opposite direction is terminated by means of a lug 29 formed on the washer 28 which also engages the stop 27.

Mounted on the bottom 12 of housing 11 is a bracket 32 having a depending flange 31. Attached to this flange is a control switch 33 and a calling switch 34. The switch 34 has two movable leaves 35 and 36 insulated from one another and from the bracket 32. These leaves are formed with contacts 37 and 38 which normally engage one another and close the circuit through the same. The leaf 35 engages an adjustable stop 39 which is mounted on a plate 41 secured to the bottom 12 by means of a screw 42. The leaf 35 is constructed, as shown in Figs. 8 and 9, with an enlarged portion 43 having an opening 44 in the same. This portion is also constructed with a transverse groove 45 in the same. A companion piece 46 is similarly constructed and overlies the enlarged portion 43. These parts may be soldered or otherwise attached to one another. By means of this construction, two bearings 47 and 48 are provided. Received in the opening 44 is a cam 49 which has a pintle 51 extending through the same and secured thereto. This pintle is journaled in the bearings 47 and 48. The cam 49, as best shown in Fig. 4, has a cam member 52 which is actuated by means of a cam wheel 53. This wheel is mounted on a reduced portion 54 of the shaft 22 at the other end thereof which is similar to the reduced portion 21. The portion 54 has a keyway 51 and is threaded to receive a lock nut 55 which clamps the said wheel in place on said shaft. The cam wheel 53 is constructed with rectangular shaped teeth 56 which engage the cam member 52 and move the same in opposite directions. Cam 49 has a cam member 57 which engages the leaf 36, When the wheel 53 is rotated in a clockwise direction, as viewed in Fig. 4, cam 49 is moved in a counter-clockwise direction and the switch 34 opened as shown in Fig. 3. The cam 49 is also formed with a heel 58 which is engageable with leaf 35. When said cam is moved in the opposite direction, the heel 58 on the same engages said leaf and restrains rotation of cam 49 relative thereto. This causes simultaneous movement of both of the leaves 35 and 36 away from stop 39, thereby maintaining the circuit through the switch 34 closed as indicated in Fig. 5.

Switch 33 is normally held in open position by means of the following construction: This switch has two leaves 60 and 61 which are attached to and insulated from the flange 31 of bracket 32. Bolts 62 extend through the leaves of both of said switches and through suitable insulating washers 63 as well as the flange 31 of bracket 32 and hold both of the switches attached to and insulated therefrom. The leaves 60 and 61 have contacts 64 and 65 and the said leaves are stressed so as to normally bring said contacts in engagement to close a circuit through the switch. The leaf 60 is constructed with a finger 66 at the end of the same and which is normally engaged by a pin 67 mounted on the cam wheel 53. This pin, when the calling device is in disuse, engages the finger 66 shown in Fig. 3 and opens the circuit through the switch 33.

Formed in the closure 14 is an annular groove 72 best shown in Fig. 1. Encircling the shaft 22 and between the finger wheel 25 and said closure is a case 73 formed with a radial wall 74 and with a plurality of fingers 75 extending normally outwardly therefrom and forming a flexible annulus. These fingers have outturned projections 76 at their ends and which, when the fingers 75 are squeezed together, are adapted to be engaged in the groove 72 to hold the case frictionally mounted on the closure 14.

The shaft 22 is urged to rotate in a counter clockwise direction, as viewed in Fig. 7, by means of a helical clock spring 68 mounted in the case 73. This spring is secured to the washer 28 by means of a loop 69 formed on the end of said spring and which engages an ear 71 struck out of the washer 28. The other end 77 of this spring extends between two of the fingers 75 of the case 73 and is thus anchored thereto. By rotating the case 73, initial tension can be put on the spring to cause the finger wheel to return to normal position at the desired rate of speed.

For the purpose of adjusting the tension of the spring 68 a device shown in Fig. 7 is employed. This device is in the form of a pair of pliers having two crossed levers 90 and 91. These levers are pivoted together by means of a rivet 92 and are formed with handles 93 and jaws 94. The jaws 94 are arcuate in form and are adapted to fit over the fingers 75 of the case 73 and when the handles 94 are brought together the jaws compress said fingers and permit of rotating the case 73 relative to the closure 14. Thus the tension on the spring 68 may be adjusted to suit the requirments and procure the return of the finger wheel at the desired rate of speed.

Mounted on the shaft 22 and disposed within the housing 11 is a rotor 78. This rotor is constructed of ferrous material and is provided with slots 79 extending about the periphery thereof. An annular groove 81 formed on each side of said rotor is connected to said slots. In the said grooves and slots is cast an aluminum casting and which forms in said rotor an amortisseur winding indicated by the reference numeral 83. Disposed within the housing 11 and cooperating with the rotor 78 is an annular permanent magnet 84 which has poles 85 on the same facing the rotor 78. This magnet is held in place by means of two washers 86 disposed one on each side thereof and bolts 87 which extend through said washers and core and also through the closure 14 and the bottom 12 of housing 11. Washers 88 on the shaft 22 adjacent rotor 78 hold said rotor properly aligned with respect to the permanent magnet 84. The rotor 78 has ten poles while the magnet 84 has eight poles. Thus two groups of poles are provided on both the magnet and rotor and the poles in each group differ by one.

The device is used in the customary manner. When the finger wheel is turned in a clockwise direction, the heel 58 of cam 49 engages the leaf 35 of switch 34 and moves both leaves simultaneously retaining the circuit through the switch closed. As soon as the wheel 25 is released, spring 68 rotates the shaft 22 in the opposite direction. This causes the cam 57 to successively open and close the switch 34 and to actuate the circuits at the telephone exchange. During such movement, the circuit through the switch 33 is closed, the pin 67 having become disengaged from the finger 66. As soon as switch 34 has completed its function said pin engages finger 66 and opens switch 33. The call is then completed at the telephone exchange and the telephone used in the customary manner.

The advantages of the invention are manifest. The calling device has a minimum number of parts and is positive and effective in action. The switch mechanism is simple in construction and will operate indefinitely without attention. The switch mechanism likewise has a minimum number of parts. By means of the spring construction employed, the spring tension may be varied without taking the mechanism apart so as to procure any desired timing.

Changes in the specific form of the invention, as herein described, may be made within the scope of what is claimed without departing from the spirit of the invention.

Having described the invention, what is claimed as new and desired to be protected by Letters Patent is:

1. In a telephone calling device, supporting means, a shaft carried thereby and rotatable relative thereto, a dial mounted on said supporting means, a finger wheel attached to said shaft and serving to rotate the same, resilient means acting between said supporting means and shaft and stressed upon manual rotation of the wheel in one direction to urge rotation of the shaft in the opposite direction, switch means operated by said shaft upon movement in said last named direction, said shaft and supporting means having corresponding parts, a magnetic structure carried by one of said parts and including a number of groups of pole pieces, there being an even number of pole pieces in each group, a core carried by the other of said parts and having the same number of groups of pole pieces as the magnetic structure, the number of pole pieces in each group of the core differing from the number of pole pieces in each group of the magnetic structure by one, the pole pieces on said shaft being movable past the pole pieces on said supporting means, and an amortisseur winding on said core.

2. In a telephone calling device, supporting means, a shaft carried thereby and rotatable relative thereto, a dial mounted on said supporting means, a finger wheel attached to said shaft and serving to rotate the same, resilient means acting between said supporting means and shaft and stressed upon manual rotation of the wheel in one direction to urge rotation of the shaft in the opposite direction, switch means operated by said shaft upon movement in the last named direction, said shaft and supporting means having corresponding parts, a magnetic structure including a number of pole pieces and carried by one of said parts, a core having a number of pole pieces differing in number from the number of said first named pole pieces by two and carried by the other part, the pole pieces on said shaft being movable past the pole pieces on said supporting means and an amortisseur winding on the pole pieces of said core and functioning to retard the movement of said shaft brought about by said resilient means.

3. In a telephone calling device, supporting means, a shaft carried thereby and rotatable relative thereto, a dial mounted on said supporting means, a finger wheel attached to said shaft and serving to rotate the same, a circular case encircling said shaft and concentric therewith, guide means for supporting said case for rotation about the axis of said shaft, said case having longitudinally extending flexible fingers arranged in a circle concentric with the axis of said shaft, an annular shoulder on said supporting means engaged by said fingers and supporting said case for rotation about the axis of said shaft, said fingers frictionally engaging said shoulder and restraining rotation of said case, a helical spring disposed within said case and acting between said shaft and case and means acting between said supporting means and shaft and retarding the movement of said shaft caused by said spring.

4. In a telephone calling device, supporting means, a shaft carried thereby and rotatable relative thereto, a dial mounted on said supporting means, a finger wheel attached to said shaft and serving to rotate the same, a circular case encircling said shaft and concentric therewith, guide means for supporting said case for rotation about the axis of said shaft, said case having longitudinally extending flexible fingers arranged in a circle concentric with the axis of said shaft, said supporting means having an annular inwardly facing groove therein providing a shoulder, and outwardly extending projections on said fingers received in said groove and engaging said shoulder and restraining rotation of said case, a helical spring disposed within said case and acting between said shaft and case and means acting between said supporting means and shaft and retarding the movement of said shaft caused by said spring.

References Cited in the file of this patent

UNITED STATES PATENTS

| | | |
|---|---|---|
| 2,043,674 | Obergfell | June 9, 1936 |
| 2,275,448 | Legg | Mar. 10, 1942 |
| 2,543,014 | Grace | Feb. 27, 1951 |
| 2,716,160 | Pitt | Aug. 23, 1955 |